United States Patent [19]

Chan et al.

[11] 3,943,067

[45] Mar. 9, 1976

[54] PROCESS FOR MANUFACTURING HYDROGENATION CATALYSTS

[75] Inventors: Trinh Dinh Chan, Rueil-Malmaison; Germain Martino, Poissy; Lucien Sajus, Croissy-sur-Seine; Claude Roux-Guerraz, Paris, all of France

[73] Assignee: Institut Francais du Petrole, Paris, France

[22] Filed: Apr. 17, 1974

[21] Appl. No.: 461,659

Related U.S. Application Data

[63] Continuation-in-part of Ser. No. 359,595, May 11, 1973, abandoned.

[30] Foreign Application Priority Data

May 15, 1972 France .............................. 72.17357

[52] U.S. Cl. ............. 252/430; 252/428; 252/429 C; 252/441
[51] Int. Cl.² B01J 31/04; B01J 31/12; B01J 31/14; B01J 27/08
[58] Field of Search ............ 252/429 C, 429 A, 430, 252/431 R, 431 C, 428, 441

[56] References Cited
UNITED STATES PATENTS
3,591,656   7/1971   Kroll .......................... 252/429 C X FOREIGN PATENTS OR APPLICATIONS
697,780   11/1964   Canada ........................... 252/429 C

OTHER PUBLICATIONS

Lapporte et al., "Hydrogenation of Alomaties with Complex Metal Catalysts," J. Org. Chem., 28 (July, 1963) pp. 1947–1948.

*Primary Examiner*—Patrick P. Garvin
*Attorney, Agent, or Firm*—Millen, Raptes & White

[57] ABSTRACT

Process for manufacturing a catalyst suitable for the hydrogenation and reforming reactions, comprising impregnating, at a temperature of a least 160° C, a solid carrier, with a homogeneous catalyst solution obtained by admixing in a solvent, at a temperature above 100°C, a salt of a metal whose atomic number is in the range of from 22 to 29, 40 to 47, 72 to 79 and 90 to 92, with a metallic or organo-metallic reducing agent, the metal component being selected from groups Ia, IIa, IIb and IIIb.

7 Claims, No Drawings

PROCESS FOR MANUFACTURING HYDROGENATION CATALYSTS

This application is a continuation-in-part of our co-pending application Ser. No. 359,595 filed May 11, 1973, now abandoned.

The present invention concerns a new process for manufacturing heterogeneous catalysts having a very high activity and which may be used in numerous applications, particularly for the hydrogenation of unsaturated compounds, (specially of unsaturated hydrocarbons) and in reforming reactions, the term "reforming" encompassing such reactions as dehydrogenation, hydroisomerization, aromatization, dehydrocyclization of various hydrocarbons, particularly paraffins and cycloparaffins.

It is known that the reaction of an organo-metallic reducing agent with a salt of a transition metal yields a very active homogeneous catalyst for the hydrogenation, in solution, of unsaturated hydrocarbons such as olefins, acetylenics or aromatics. In spite of this fact, the processes making use of soluble hydrogenation catalysts have not yet been developed industrially on a large scale in view of the fact that the catalyst price is generally very high as compared to that of the heterogeneous catalysts although the latter are less active.

In order to associate the high activity of the homogeneous catalysts with the low cost, per ton of converted products, of the conventional heterogeneous catalysts, various techniques have been used. The main features of these techniques have been disclosed in various patents among which there can be mentioned the French Pat. Nos.: 1,367,202, 1,597,517, or the French patent of addition 95,896 or still the U.S. Pat. No. 3,536,632.

These processes may be subdivided in three classes :

The process No. 1 consists of preparing a homogeneous catalyst which is then used either according to a first embodiment which may be called 1 A, for activating a conventional heterogeneous catalyst, or, according to a second embodiment, which will be called 1 B, deposited on an inorganic carrier. According to process No. 2, a carrier is impregnated with the reducing agent and then a metal salt is reacted with the so-treated carrier.

Process No. 3 makes use at first of an impregnation of the carrier with a metal salt, followed by a calcination at temperatures ranging around 500°C and, finally, a reduction with the required amount of reducing agent.

The catalysts prepared according to the process No. 3 are those which, according to the U.S. Pat. No. 3,536,632, are the best. This is confirmed in the French Pat. No. 2,072,586, filed more recently, in which it is stated that the activities obtained by process No. 3 are still better.

It has been discovered, on the contrary, and this is the object of the present invention, that all the preceding techniques may be still further improved and new hydrogenation catalysts prepared, which exhibit both remarkable activity and stability, by impregnating, at temperatures of at least 160°C, convenient carrier substances which are hereinafter defined, by means of solutions of homogeneous catalysts obtained by admixing, in a solvent at temperatures higher than 100°C, a salt of a transition metal with an inorganic or organo-metallic reducing agent. This idea was suggested in U.S. Pat. No. 3,536,632, but was not selected as the best method. It should be mentioned that in this U.S. patent, it is taught to carry out the impregnation of the carrier by the homogeneous catalyst at a temperature of from −60° to 150°C, and preferably from −10° to +100°C whereas, according to the present invention, it is, on the contrary, necessary to proceed at a temperature of at least 160°C (see the following examples according to the invention and the comparative examples 3 and 30).

The metal component of the reducing agent is selected from the elements of groups Ia, IIa, IIb, and IIIb of the periodic classification of elements.

The conditions in which the catalytic solution is prepared and its impregnation carried out have a great influence on the possibility of obtaining the best activity: this activity corresponds substantially to that of the homogeneous catalyst.

PREPARATION OF THE SOLUTION

The preparation of the homogeneous catalyst proceeds by interaction of a metal component and an inorganic or organo-metallic reducing agent, in the presence of a solvent compatible with the reducing agent.

As metals present in the metal compound, there can be used those having atomic numbers from 22 to 29, from 40 to 47, from 72 to 79 or also from 90 to 92. They can be used in the form of salts or in the form of complexes of one of these salts with coordinates of the Lewis base type such as carbon monoxide or ammonia, this list being not limitative. The anions of the salts may be, for example, halides, alcoholates or caboxylates.

As reducing agents, there can be used metals from group Ia or their derivatives, for example the derivatives obtained by action of a metal of group Ia on an aromatic hydrocarbon such as naphthalene, derivatives of saturated hydrocarbons such as butyl lithium, hydrides mixed hydrides with the metals of group IIIb such as boron or aluminum and their derivatives of substitution by alcohols such, for example, as sodium alcoxyanalates (Na $AlH_2$ $(OR)_2$). It is preferred to make use of the organo metallic agents which are soluble in hydrocarbons or their ether derivatives. For example, there can be used the already mentioned lithium or sodium organic compounds or the magnesium, zinc or aluminum organic compounds, particularly those of formula Al $R_3$ in which R is a hydrocarbon radical.

As examples of metal compounds and inorganic or organometallic reducing agents, there may be mentioned those indicated in the above-mentioned French and U.S. patents.

The molar ratio of the transition metal compound to the reducing compound is usually from 1:30 to 10:1 and preferably from 1:10 to 1:1.

As solvents there can be used saturated or unsaturated hydrocarbons in a pure state or as mixtures, ether solvents, nitriles and with certain reducing agents, it is possible to proceed in the presence of alcohols. The selection of the solvents will depend on the solubility of the metal salts and of the reducing agents. However, it may happen that one of the catalyst components be only slightly soluble : in any way, ater interaction of the two components (metal salt and reducing agent), the catalyst is solubilized.

The best activity rates are obtained by admixing the reducing agent with the metal salt under inert atmosphere at temperatures from 100° to 250°C.

IMPREGNATION

For carrying out the impregnation, it is desirable to make use of the catalytic solution at a concentration of from $10^{-1}$ to $10^{-6}$ atom-gram of transition metal per liter in order to obtain an uniform impregnation of the carrier. It is preferable to proceed with so diluted solutions as possible : the preferred concentrations are from $10^{-3}$ to $10^{-5}$ atom-gram of metal per liter.

The selected amount of carrier is impregnated with the diluted solution, either under dry conditions or wet conditions or still by circulating the solution over the carrier placed in a fixed bed in the reactor. This last mentioned technique is preferred since it has various advantages :

It results in the synthesis of the catalyst within the unit and avoids any manipulation of pyrophoric solids, it requires only a minimum amount of solvent, irrespective of the desired metal amount to be deposited on the carrier, due to a continuous recycling of the impregnation solvent.

In this case, the circulation velocity has also a great importance : too low a velocity would result in a preferential absorption in the inlet portion of the carrier bed and this would be contrary to good conditions of use. The velocity depends essentially on the nature of the carrier : generally good impregnations are obtained with velocities from 5 to 500 liters of solution per kg of carrier and per hour.

Another very important feature is the impregnation temperature. As a matter of fact, it has been observed that impregnations carried out at room temperature result in catalysts having a very low activity.

The temperatures are at least 160°C but the best catalysts are those produced by proceeding at temperatures from about 160°to 250°C, preferably about 160°–220°C, for example about 160°–170°C.

As carriers there can be used inorganic or organic solids. The carriers which are the most convenient, according to the invention, are the oxides of metals such as magnesium, aluminum, titanium, zirconium, torium or silicium either taken alone or in mutual association or associated with oxides of other elements of the periodic classification. Before the impregnation, it is important to subject the carrier to a treatment for removing as much water as possible, such as a calcination or any other treatment which provides for a reduction of the water content of carrier. The hydroxyle OH group content is not critical; the surface per gram of carrier is not critical either: thus, $\alpha$ alumina ($s = 5m^2/g$) and $\gamma$ alumina ($S = 200m^2/g$) were both impregnated and gave the same results.

After impregnation, drying in a stream of inert gas may be carried out, if so desired.

The resulting catalysts may be used in an ebullated bed, fluid bed, moving bed or fixed bed.

They are useful for the hydrogenation of unsaturated hydrocarbons : olefinic, diolefinic, acetylenic or aromatic hydrocarbons, in the presence or the absence of sulphur derivatives. They can be used for carrying out selective hydrogenations. This type of hydrogenation is generally conducted at a temperature from −50°to 200°C, preferably from 0° to 150°C, and under a pressure from 0.01 to 300 bars.

The obtained catalysts are also useful for reactions of the reforming type, which are generally conducted at a temperature from 300° to 700°C and under a pressure of, for example, from 1 to 20 bars. In certain cases, hydrogen atmosphere is favourable.

The following examples illustrate the present invention without however limiting the scope thereof. Examples 1, 3, 5 and 30 are only given by way of comparison and form no part of the invention.

EXAMPLE 1

In a reactor of the Grignard type, of stainless type and equipped with a system for the injection of the catalyst under pressure, we introduce, under argon atmosphere, 95 g of toluene and raise the temperature to 170°C. Then we introduce 5 g of a solution of catalyst obtained by the action of 2.4 mmoles of triethylaluminum on 0.6 mmole of nickel stearate at 160°C in toluene. The pressure is increased to 30 bars by means of hydrogen and the mixture is stirred. After one hour, hydrogen is no longer absorbed. The analysis of the effluent shows that toluene has been converted to methyl cyclohexane without detectable formation of secondary products.

EXAMPLE 2

In the same apparatus as in example 1, we introduce 10g of $\alpha$ alumina, calcinated at 1100°C. Under argon atmosphere, 95g of toluene are added and the temperature is raised to 170°C and then, we introduce the catalytic solution prepared according to example 1, at the same concentration. After stirring under argon atmosphere for 3 to 5 minutes, a sample of 1g of solution is taken. The sample has a clear appearance and contains no nickel : consequently, the catalyst has been absorbed on the alumina. The hydrogen pressure is then brought to 30 bars and stirring is performed. After 1 hour, the hydrogen absorption is stopped and the analysis of the effluent shows the presence of methylcyclohexane.

This example shows that the reaction velocity on the supported catalyst is identical to that of the homogeneous catalyst from which it is derived.

EXAMPLE 3

In an apparatus identical to that of example 1, we introduce 10g of $\alpha$ alumina calcinated at 1100°C; then we add 95g of toluene and, at room temperature, we introduce a catalytic solution obtained as in example 1. After stirring under argon atmosphere, we take a sample of 1g : the solution is clear and contains no nickel, which proves that the catalyst has been absorbed on the carrier.

Under argon atmosphere, the temperature is quickly raised to 170°C and the hydrogen pressure up to 30 bars and then stirring is performed. The hydrogen consumption is . much slower and after 1 hour, the analysis of the sample shows the presence of 10% of methylcyclohexane, the remaining portion being toluene.

This example shows that the catalyst is much less active when the impregnation is conducted at room temperature.

EXAMPLE 4

200 cc of a catalytic solution prepared as in example 1, are reacted, at 170°C and under agron atmosphere, with 10g of $\alpha$ alumina treated at 1100°C. After a few minutes, the solvent is removed and the catalyst is dried. The latter is introduced, under argon atmosphere, into a conventional tubular reactor. The temperature is raised to 170°C, the hydrogen pressure to 30 bars and the ratio $H_2$/hydrocarbon is maintained at 8, while injecting toluene at a rate of 100 g per hour. The effluent only contains methyl cyclohexane.

EXAMPLE 5

By way of comparison, a catalyst has been prepared according to the technique consisting of depositing the nickel salt on the same carrier ($\alpha$ alumina) in an aqueous medium, calcining at 500°C, reducing with a solution of triethylaluminum at 100°C and treating under hydrogen atmosphere at 300°C during 1 hour. The activity test has been conducted under conditions identical to those of the preceding example and, although the catalyst contained 6 times more nickel, the effluent still contained 50 percent by weight of unconverted toluene.

EXAMPLE 6

According to the preferred mode of preparation, 10g of $\alpha$ alumina preliminarily roasted at 1000°C, are introduced into a tubular reactor. It is dried again under anargon stream at 170°C for 2 hours. Then, according to the method described in example 1, we prepare, at 160°C, a homogeneous catalyst containing 0.6 mmole of nickel stearate and 2.4 mmoles of triisobutylaluminum. The catalyst is diluted up to a volume of 2 liters by adding heptane and the solution is subsequently passed, at a rate of 120 g/h, over the carrier maintained at 170°C. When the injection is terminated, the traces of solvent are removed under a hydrogen stream. The test, carried out under conditions identical to those of example 4, shows that the effluent contains only methyl cyclohexane.

EXAMPLE 7

Example 6 is repeated except that alumina is replaced by silica and the activity of the catalyst is tested as described in example 4. The activity is substantially identical to that observed with alumina as carrier.

EXAMPLES 8 to 23

The catalysts are prepared by impregnating, at 170°C 10g of $\alpha$ alumina with 200 cc of a catalyst solution obtained by diluting with heptane the homogeneous catalyst prepared by interaction, at 160°C, of 0.6 mmole of metal salt with 2.4 mmoles of alkylaluminum in 10 cc of decahydronaphthalene. The alumina was preliminarily roasted at 700°C. The impregnation is then carried out outside of the reactor; the catalyst is dried under vacuum and introduced under argon atmosphere into the tubular reactor used for this test.

The test of hydrogenation of toluene or benzene is conducted under a total pressure of 30 bars, with a molar ratio of hydrogen to the reactant of 8. There is not observed the formation of any other product than methyl cyclohexane or cyclohexane. In the following table, the last column gives the composition of the effluent, determined by chromatography.

| Ex n° | Metal salt | reducing agent | reactant | reactant flow rate (g/h) | T°C | content of the effluent cyclohexane or methyl cyclohexane (% b.w.) |
|---|---|---|---|---|---|---|
| 8 | nickel stereate | Al Et$_3$ | toluene | 100 | 150 | 100 |
| 9 | " | Al Et$_3$ | " | 100 | 120 | 100 |
| 10 | " | Al (iC$_4$H$_9$)$_3$ | benzene | 150 | 120 | 100 |
| 11 | cobalt stereate | Al (iC$_4$H$_9$)$_3$ | toluene | 100 | 170 | 100 |
| 12 | " | Al Et$_3$ | toluene | 100 | 120 | 70 |
| 13 | " | Al Et$_3$ | benzene | 100 | 150 | 100 |
| 14 | " | Al Et$_3$ | " | 100 | 120 | 90 |
| 15 | iron stereate | Al Et$_3$ | " | 100 | 120 | 12 |
| 16 | " | Al Et$_3$ | " | 100 | 170 | 50 |
| 17 | molybdum octoate (III) | Al H (iC$_4$H$_9$)$_2$ | " | 100 | 170 | 100 |
| 18 | tungsten acetate | Al Et$_3$ | " | 100 | 170 | 100 |
| 19 | ruthenium acetylacetonate | Al Et$_3$ | " | 100 | 170 | 60 |
| 20 | palladium acetylacetonate | Al Et$_3$ | " | 100 | 170 | 80 |
| 21 | platinum acetylacetonate | Al Et$_3$ | " | 100 | 170 | 100 |
| 22 | " | Al Et$_3$ | " | 100 | 170 | 100 |
| 23 | " | Al (iC$_4$H$_9$)$_3$ | " | 100 | 100 | 100 |

EXAMPLE 24

10g of nickel catalyst, prepared according to example 6, are subjected to a test of hydrogenation of benzene containing 10 ppm of sulfur medium, the form of thiophene) at 120°C, under 30 bars, the ratio of hydrogen to the hydrocarbon being 8 300°the benzene flow rate 50g per hour. After 8 hours of run, the hydrogenation of benzene to cyclohexane is complete.

EXAMPLE 25

10g of the nickel catalyst prepared according to the method described in example 6 are subjected to a test of isoprene hydrogenation at 25°C, 30 bars and with a ratio $H_2$/hydrocarbon = 8. Isoprene is diluted by 9 times its volume of heptane and the liquid flow rate is 120g per hour. The hydrogenation to isopentane is complete.

EXAMPLE 26

The preceding example is repeated but with the introduction of 20 ppm of sulfur (in the form of thiophene) in the feed. The analysis of the effluent, after 8 hours of run, shows that isoprene is completely converted again, but it remains 20% of olefin (2-methyl-2-butene) by weight.

EXAMPLE 27

Example 25 is repeated except that 100 ppm of sulfur, in the form of thiophene, are introduced into the feed. After 5 hours of run, the analysis of the effluent gives: isoprene : < 0.3 %, methyl butenes : 95 %, isopentane : 4.7 % (percents are by weight).

EXAMPLE 28

Into a reactor of the continuous type, we simultaneously introduce tetrahydronaphthalene, hydrogen and a catalyst solution obtained by admixing, at 160°C, a solution of cobalt octoate and a solution of triethylaluminum in tetrahydronaphthalene in a ratio Al/Co =

3; the flow rates are such that the cobalt concentration in the reactor amounts to 1 mmole/liter and the molar ratio $H_2$/tetrahydronaphthalene $= 1$; the V.V.H. of tetrahydronaphthalene is 2 and the temperature 420°C.

The naphthalene content of the effluent is stabilized at 40 percent after a few hours, the rest being formed of tetrahydronaphthalene. The naphthalene content does not substantially increase with an increased cobalt concentration.

EXAMPLE 29

We prepare a homogeneous catalyst solution identical to the preceding one and containing 1 mmole/liter of Co. Separately, 10 g of powdered alumina, preliminarily roasted at 800°C, are dispersed in tetrahydronaphthalene at 160°C, under argon atmosphere. The catalyst solution is added to the alumina and after a few minutes of stirring, the solution becomes clear and no longer contains cobalt. The catalyst on alumina carrier, thus prepared, is used in a continuous reactor in the form of a fluid bed. The temperature is maintained at 420°C, the V.V.H. of tetrahydronaphthalene at 2 and the molar ratio hydrogen/tetrahydronaphthalene at 1; the naphthalene content of the effluent amounts to 78 percent by weight, the remainder being tetrahydronaphthalene.

EXAMPLE 30

The working conditions are the same as in example 29 except that the impregnation of the alumina is conducted at room temperature. The obtained catalyst is considerably less active and, under the same conditions, only results in the formation of 15 percent by weight of naphthalene.

EXAMPLE 31

We prepare a catalyst solution according to example 29 by using decahydronaphthalene as solvent at a temperature of 160°C. The alumina is impregnated in the same manner as above described and the catalyst is used in the same reactor. The reactant is cyclohexane introduced at a V.V.H. of 1 with a molar ratio $H_2$/cyclohexane of 1. The effluent contains 40 percent by weight of benzene, the remainder consisting exclusively of cyclohexane.

EXAMPLE 32

We proceed as in example 31, except that cobalt is replaced by nickel introduced in the form of stearate; the ratio Al/Ni is 3.5. The test, conducted with cyclohexane, under the same conditions, gives an effluent containing 80 percent by weight of benzene, the remainder consisting of cyclohexane.

EXAMPLE 33

We proceed as in example 31, by using as carrier, instead of alumina, silica washed with nitric acid and calcined at 1100°C. Under the same conditions, the effluent contains 90 percent by weight of benzene, the remainder being cyclohexane.

EXAMPLE 34

We proceed as in example 31, except that cyclohexane as reactant is replaced by cyclohexene; in these conditions, the composition of the effluent, by weight, is as follows : cyclohexane : 9.5 %, cyclohexene : 28.5 %, benzene : 62 %. A dismutation occurs simultaneously with the dehydrogenation reaction.

EXAMPLE 35

We proceed as in example 31, the reactant injected in the reactor being cumene, the liquid V.V.H. being 2, the molar ratio $H_2$/cumene being 2 and the temperature 450°C, there is obtained an effluent containing 15 percent by weight of $\gamma$ methylstyrene and 10 percent by weight of light hydrocarbons formed by cracking, the remainder being cumene.

EXAMPLES 36, 37 and 38

According to the technique described in example 29, starting with 10 g of alumina in the form of extrudates having a 0.5 mm diameter, we prepare 3 catalysts respectively containing 2 percent by weight of molybdenum, tungsten or nickel. After impregnation, these catalysts are dried under vacuum and introduced, under inert atmosphere, into a tubular reactor.

The catalytic test of heptane dehydrogenation is conducted under hydrogen pressure in the following conditions: $P = 10$ bars, $T = 500°C$, liquid V.V.H. $= 4$, molar ratio $H_2$/H.C. $= 4$. In these conditions, we observe the formation of light products, ($C_4$—), and also toluene. The following results are given in percent with respect to the injected heptane:

| Test No. | Catalyst | $C_4$-+losses | $C_5$ | $C_6$ | $iC_7$ | $nC_7$ | toluene |
|---|---|---|---|---|---|---|---|
| 9 | Mo | 17 | 5.1 | 1.5 | 11 | 63 | 1.4 |
| 10 | W | 10 | 2.1 | 1.2 | 4 | 80.5 | 2.2 |
| 11 | Ni | 20 | 7 | 3.0 | 2 | 66.9 | 1.1 |

EXAMPLE 39

According to the technique described in example 29, we prepare a catalyst on a powdered alumina carrier, containing 1 mmole of nickel per 10 g of alumina; after impregnation and drying, the catalyst is introduced under inert atmosphere into a continuous reactor as fluid bed. The heptane dehydrogenation test is conducted under atmospheric pressure in the following conditions : liquid V.V.H. $= 1$, molar ratio $H_2$/heptane $= 4$, $T = 500°C$. Then we observe the formation of a few lighter products $C_5+C_6$, heptane isomers, $C_7$–$C_8$ olefins and also benzene and toluene. The percent by weight of toluene obtained is 9.8 for a selectivity, with respect to the converted heptane, of 40 percent.

EXAMPLE 40

Example 29 is repeated, except that the catalyst solution is admixed with the dispersion of alumina in tetrahydronaphthalene at 205°C instead of 160°C.

The catalyst has given results comparable to those of example 29.

What we claimed is:

1. In a process for manufacturing a catalyst comprising the following steps:
   a. preparation of a homogeneous catalyst solution by admixing, at a temperature higher than 100°C, in a solvent, a compound of a metal (A) selected from the group consisting of those having atomic numbers of 22 to 28, 40 to 46, and 72 to 78 with a metallic or organometallic reducing agent, the metal (B) of the reducing agent being selected from the group consisting of metals of groups Ia, IIa, IIb, and IIIb; and b. impregnation of a solid carrier with said solution, wherein the improvement comprises conducting said impregnation at a temperature of at least about 160°C.

2. A process according to claim 1, in which the carrier is selected from the group consisting of aluminum, silicon, titanium, zirconium, magnesium and thorium oxides.

3. A process according to claim 1, wherein the impregnation temperature is about 160°–250°C.

4. A process according to claim 1, wherein the impregnation temperature is about 160°–170°C.

5. A process according to claim 1, wherein the molar ratio of the metal (A) compound to the reducing agent is from 1:10 to 1:1.

6. A process according to claim 1, wherein the concentration of the metal (A) in the catalyst solution is from $10^{-3}$ to $10^{-5}$ gram-atom per liter.

7. A catalyst obtained by the process of claim 1.

* * * * *